United States Patent [19]

Couch

[11] Patent Number: 4,510,794

[45] Date of Patent: Apr. 16, 1985

[54] AFTERBURNER FLAMEHOLDER ION PROBE

[75] Inventor: Robert P. Couch, Palm Beach Gardens, Fla.

[73] Assignee: United Technologies Corporation, Hartford, Conn.

[21] Appl. No.: 454,116

[22] Filed: Dec. 28, 1982

[51] Int. Cl.³ .................. G01M 15/00; F23N 5/24
[52] U.S. Cl. ..................................... 73/116; 60/39.03
[58] Field of Search .............. 73/115, 116, 119 R; 324/459; 340/60, 579; 60/39.03, 39.091

[56] References Cited

U.S. PATENT DOCUMENTS 2,799,136  7/1951  De Boisblanc ............... 60/39.091
3,635,018  1/1972  De Corso ........................ 73/116 X
4,359,893  11/1982  Kizler ............................ 73/116 X

*Primary Examiner*—John W. Caldwell, Sr.
*Assistant Examiner*—Ellwood G. Harding
*Attorney, Agent, or Firm*—M. P. Williams; Francis J. Maguire, Jr.

[57] ABSTRACT

An ion/electrostatic probe for an afterburning gas turbine jet engine comprises an afterburner flameholder (24) electrically insulated from other engine parts by means of non-electrically-conductive support rods (30, 45) or by means of electrically conductive rods (30) insulated (50, 52) from the engine case (12). An electrical connection (54) may be brought through the engine case. The flameholder (24) may be insulated (70) from an attached igniter.

3 Claims, 6 Drawing Figures

U.S. Patent   Apr. 16, 1985   Sheet 1 of 2   4,510,794
FIG. 1
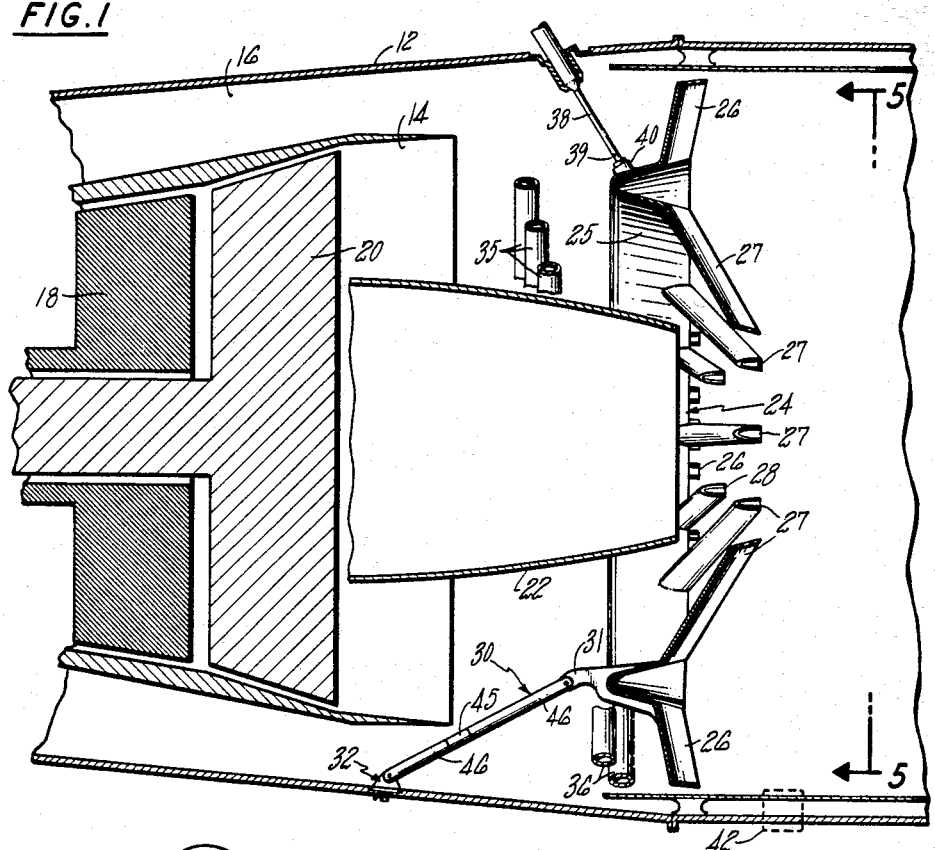
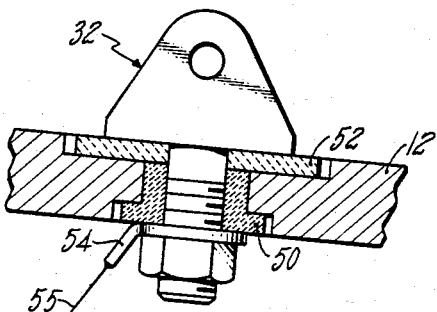
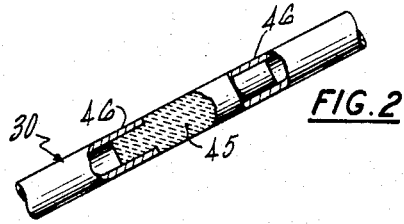
FIG. 2
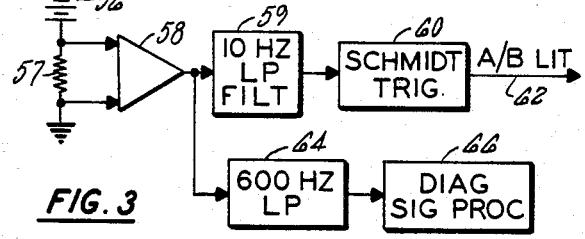
FIG. 3
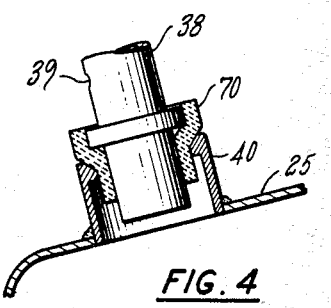
FIG. 4

AFTERBURNER FLAMEHOLDER ION PROBE

DESCRIPTION

1. Technical Field This invention relates to afterburning gas turbine engine diagnostics, and more particularly to an ion/electrostatic probe for engine wear monitoring and flame detection.

2. Background Art

In high performance military gas turbine engines, it is common to have a thrust augmentor typically referred to as an afterburner. When extra thrust is called for (as indicated by power lever angle), the afterburner is activated by spraying fuel into the gas path downstream of the turbocompressor core engine, opening the exhaust nozzle, and electrically igniting the additional fuel, with a view to consuming all possible remaining oxygen which passes through both the core engine and a fan bypass duct, in the case of a turbofan engine. In order to retain the flame within the engine (rather than simply having it blow out through the exhaust nozzle), a flameholder is utilized in the vicinity of the afterburner fuel spray rings. This retains the flame in the upstream end of the afterburner.

In afterburning turbofan engines, in order to avoid a very rapid lighting of the afterburner (which could produce an upstream-propagating pressure wave through the fan duct), the rate of fuel flow is raised slowly in stages while monitoring of the flame continues to ensure that the afterburner is in fact lit. Heretofore, this has been achieved by means of ultraviolet detectors, utilizing the Geiger-Muller principle (single photon detectors). However, during the light-off process, it is not uncommon for some of the unburned jet fuel to contact the surface of the detector; and since jet fuel is extremely absorbent of ultraviolet radiation, a false indication of flame-out is not uncommon. Alternatively, as the signal should be increasing due to an increasing fuel flow rate in the various stages of the light-off, the actual signal decreases due to the newly injected afterburner fuel contacting the ultraviolet detector. Additionally, a cloud of unburned fuel mist can absorb the ultraviolet light before it reaches the detector. Furthermore, the actual igniter itself, as well as radiation entering the exhaust nozzle from the sun, can cause the ultraviolet detector to give false indications of light-off. Once the afterburner is lit, it is preferable to know if it flames out for any reason so that the fuel can be chopped immediately, thus avoiding a fuel build-up, subsequent reignition and potentially disastrous explosion.

An improvement to ultraviolet detection of afterburner light-off utilizing ionic conductivity of the flame is disclosed in a commonly owned, copending U.S. patent application entitled "Electrostatic Afterburner Light-off Detector", Ser. No. 454,117, filed contemporaneously herewith by Couch. As described therein, a biased electrostatic probe is utilized to detect the presence of flame, the ionic content of which (although without any net electrostatic charge) permits conduction from the probe to the engine walls, detection of which is indicative of flame.

In high performance military aircraft, the engines are run closer to the limit and more rapidly cycled between high and low thrust; therefore, wear is more excessive than in other types of aircraft engines. It is therefore useful to provide in-flight engine diagnostics with recording of signals indicative of engine performance and conditions during the flight. As is described in a commonly owned, copending application entitled "Waveform Discriminated Electrostatic Engine Disgnostics", filed contemporaneously herewith by Zwicke et al, Ser. No. 454,124, the use of ion diagnostics to monitor debris resulting from erosion and rubbing in gas turbine jet engines is described. To perform such diagnostics during flight requires engine-mounted electrostatic probes. Achieving maximal diagnostic response during electrostatic debris monitoring of the jet engine while in flight requires that a probe be mounted downstream of the core engine. Obviously, in an afterburning engine, any structure mounted downstream of the flameholder would be wholly destroyed by the flame itself, unless cooled in an unduly complicated fashion. The imposition of probe structures between the core engine and the flameholder could disrupt fuel and gas flow patterns, and add complexity and weight to the engine.

Obviously, an ion probe capable of performing both ionic afterburner flame detection and electrostatic engine wear monitoring would have great utility in afterburning military engines.

DISCLOSURE OF INVENTION

Objects of the invention include provision of an ion probe capable of ionic flame detection and electrostatic engine wear monitoring, one which does not add weight or complexity to the engine, and one which is useful in a wide variety of in-flight and ground test diagnostic applications.

According to the present invention, an ion/electrostatic probe for an afterburning gas turbine jet engine comprises an afterburner flameholder which is totally electrically insulated from other engine parts and provided with an electrical connection external to the engine.

The invention may be implemented by utilizing insulative support rods, or by simply insulating the connection between the support rods and the engine case. Electrical connection external to the engine may be provided by a conductive support rod having an electrical connection through the engine case which is insulated from the engine case.

The ion/electrostatic probe of the present invention may be used in biased and non-biased applications for sensing flame and/or electrostatic net charge. The invention is best suited for use as an afterburner light-off detector as well as for use as an electrostatic probe for monitoring electrostatic debris of the turbocompressor core engine.

The foregoing and other objects, features and advantages of the present invention will become more apparent in the light of the following detailed description of exemplary embodiments thereof, as illustrated in the accompanying drawings.

BRIEF DESCRIPTION OF DRAWINGS

FIG. 1 is a partial, sectioned side elevation view of the midsection of an afterburning gas turbine engine, illustrating an insulated flameholder ion probe in accordance with the invention;

FIG. 2 is a partial, sectioned side elevation view of an insulating flameholder support rod which may be used in the probe of FIG. 1;

FIG. 3 is a partial, sectioned side elevation view of a flameholder support rod anchor clevis, insulated from the engine wall, which may be used with the probe of FIG. 1, including a simplified schematic block diagram of circuitry connected through the clevis to the, flameholder;

FIG. 4 is a partial, sectioned side elevation view of an insulated igniter for use with the probe of FIG. 1;

BEST MODE FOR CARRYING OUT THE INVENTION

Figure 5:
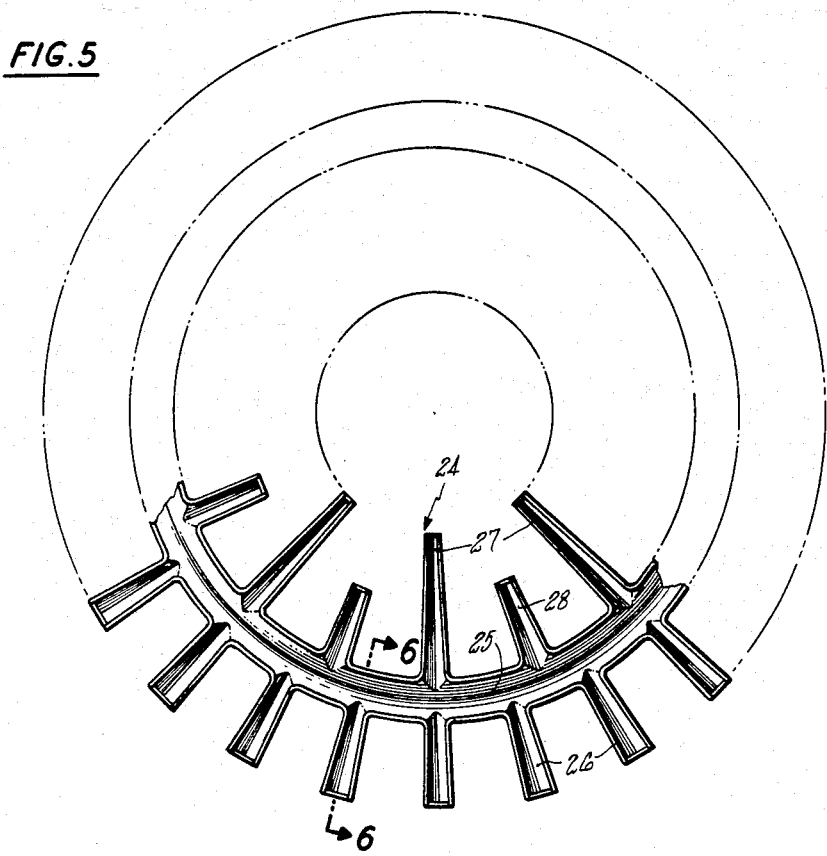
FIG. 5 is a partial, end elevation view of the flameholder probe of FIG. 1.

Referring now to FIG. 1, the midsection of an afterburning gas turbine engine is shown schematically to include an outer engine wall 12, a core/fan splitter 14 that defines the inner wall of a fan duct 16, a high pressure turbine 18, a low pressure turbine 20 and an exhaust cone 22.

Figure 6:
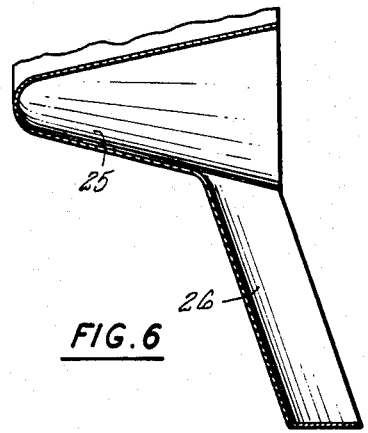
FIG. 6 is a sectioned view taken on the line 6—6 in FIG. 5 illustrating the trough-like shape of the flameholder itself.

An afterburner flameholder 24 has the general configuration of a cookstove grating, as seen in the end view of FIG. 5, but instead of being a solid, generally planar casting, it consists of intersecting, mutually communicating troughs of sheetmetal, at slight angles. Referring to FIGS. 1, 5 and 6, these include a main circular trough 25; short, radially outward extending troughs 26; long, radially inward extending radial troughs 27; and short, radially inward extending troughs 28. The view thereof in FIG. 1 has been simplified by eliminating certain of the radially extending troughs 26-28 and otherwise simplifying the construction shown. The flameholder is supported coaxially with the engine wall 12 at about ten places, only one of which is shown in FIG. 1, by means of support rods 30 disposed between clevises 31 attached to the flameholder 24 and clevises 32 bolted through the engine wall 12. The support rods 30 hold the flameholder in much the same fashion that spokes on a vehicle wheel dispose the hub with respect to the rim thereof.

Afterburner fuel is provided by a plurality of full-circle spray rings 35, 36, only portions of a few of which are schematically illustrated herein for simplicity. The spray rings 35, 36 provide a mist of atomized jet fuel which is carried downstream (to the right in FIG. 1) as a consequence of core exhaust flow between the exhaust cone 22 and the core/fan splitter, and as a consequence of fan air flowing in the fan duct 16. The exhaust, air and fuel mist mix together to form a combustible mixture, some of which flows into an igniter 38, such as through a port 39 therein. The igniter 38 is secured by means of a boss 40 to the flameholder at one point. The ignited fuel within the igniter then ignites more of the air/fuel mixture causing flame to form immediately adjacent to and downstream of the flameholder 24. As the flameholder warms up, the combustion process begins at the flameholder and flame appears several millimeters from the surfaces of the troughs of the flameholder, downstream thereof. In order to avoid rapid build-up of pressure in the afterburner which could force a reverse pressure wave upstream through the fan duct 16 (to the left in FIG. 1), it is common in turbofan afterburning engines to use soft-light procedures which introduce the fuel in stages. In order to avoid explosion, it is necessary to ensure that there is flame; if not, feeding fuel through the spray rings 35, 36 must be discontinued. As described briefly hereinbefore, typical afterburning engines known in the art may therefore provide ultraviolet flame detectors, such as in the general vicinity indicated by the dotted box 42, although its circumferential position may be closer to the igniter 38 than is indicated in FIG. 1.

The description thus far is descriptive of a portion of an afterburning turbofan engine known to the art. The present invention is achieved simply by electrically insulating the flameholder from the remainder of the engine and providing an electrical connection between the flameholder and electronic circuitry to be used therewith.

Referring now to FIG. 2, the support rods 30 may have an insulating portion 45 and metal portions 46. If the metal portions 46 are hollow (which is typical) the insulating portion 45 may be shrunk fit, threaded or brazed (if a suitable insulating material is used). A brazable insulation is a glass ceramic having a two-phase microstructure of randomly oriented mica crystals in a glass matrix, such as that which is available under the trade name "MACOR" from Corning Glass Works, Corning, New York, U.S.A. If all of the support rods 30 are insulators, then an electrical connection must be carried out from the flameholder 24 along one of the support rods and through the engine wall (such as through a hollow clevis bolt 32 or other passage through the engine wall 12). On the other hand, the support rods 30 may be entirely conductive (unaltered from those used in the prior art) and insulating of both the support rods 30 and the flameholder 24 may be achieved by insulating the clevis bolts 32 from the engine wall 12, as illustrated in FIG. 3. Therein, the clevis bolt 32 is insulated from the engine wall 12 by means of an insulating spacer 50 and an insulating washer 52 in a well known manner. The utilization of a conductive rod 30 and an insulated clevis bolt 32 is a simple means of providing electrical connection from the flameholder 24 to the electric circuitry, such as that illustrated in FIG. 3. In fact, use of insulating support rods 30 in all but one instance, and use of an insulated clevis bolt 32 in that one instance is a convenient way to both isolate the flameholder 24 from the engine and provide electrical connection to the circuitry.

In FIG. 3, the clevis bolt 32 is shown having a common terminal lug 54 fastened thereto from which an electrical connection 55 leads to a D.C. bias voltage source, such as a battery 56, which is connected through a resistor 57 to ground. The resistor is selected so that for the magnitude of bias used, on the occurrence of afterburner light-off, conductivity through the plasma of the flame will provide a suitably detectable voltage (e.g. 1-10 volts) across the resistor 57. For instance, with a 9 volt bias voltage provided by a battery 56, a resistor on the order of 100K Ohms is typically suitable. The voltage across the resistor is passed through an amplifier 58, the output of which is passed through a low pass filter 59 which may have its upper break point at on the order of 10 Hz. This eliminates noisy spikes which are not of interest. The filtered signal is then applied to a Schmidt trigger 60 which may have a threshold level of on the order of one-half to one volt. When flame is present, the Schmidt trigger will fire providing a signal indicative of the fact that the afterburner is lit, on an output signal line 62, as in the aforementioned Couch application. If the flameholder of the present invention is to be used with a computer-implemented signal processing system, then the filter and/or the Schmidt trigger function could be performed by suitable software in such a computer, utilizing techniques which are known in the art. Also illustrated in FIG. 3 is the fact that the signal developed through the amplifier 58 may be utilized for other engine diagnostics, the signal may be passed through a low pass filter having an upper break point on the order of 600 Hz and thereafter be applied to suitable diagnostic signal processing apparatus 66. If the signal processing apparatus is a computer, the low pass filter 64 may be implemented with suitable software algorithms, as is known in the art. The diagnostic signal processing may take the form described and claimed in the aforementioned Zwicke application, or otherwise.

The difference in the filters 59, 64 is based on the fact that essentially a steady state condition of afterburner light-off is desired in one case, whereas if debris monitoring of the core engine outflow is being accomplished with electrostatic diagnostics, the 600 Hz filter is designed to eliminate sharp Trichel pulses, while at the same time allowing the passage of signals indicative of net static charge passing the flameholder probe 24 with signal variations of interest on the order of half a millisecond. For debris monitoring, it is preferable to have the probe unbiased, as described in a commonly owned, copending U.S. patent application entitled "Adaptive Electrostatic Engine Diagnostics", Ser. No. 454,124, filed contemporaneously herewith by Rosenbush et al.

Referring now to FIG. 4, in the case where the igniter provides metal to metal grounding of the flameholder to the engine wall 12, the flameholder 38 may be insulated from the boss 40 by a suitable insulating spacer 70 which may be of any suitable material such as the aforementioned MACOR or other known materials. Of course, the insulation referred to with respect to FIGS. 2, 3 and 4 may all be enhanced by providing suitable coatings, such as Teflon, on the metal parts as well as by providing additional pieces of insulating material, or by selecting from among the various techniques described, as seems to be suitable in any given case.

The foregoing description of an embodiment of an electrostatic/ion flameholder probe of the present invention is illustrative merely, being a brief description of one flameholder probe which has actually been reduced to practice and found suitable for the various purposes described hereinbefore. Obviously, engines of another design may have flameholders of a different design which require different techniques to provide the insulation thereof from other engine parts and electrical connection between it and suitable circuitry. However, since most flameholders are designed to provide a maximal, uniform flame attachment across the cross section of the engine, they will also be extremely suitable as electrostatic probes since literally any electrostatic charge passing through the engine core will provide a signal from the probe. As illustrated in FIG. 3, the probe is biased for flame detection. The probe may be used only for flame detection in which case the other circuitry 64, 66 would not be necessary. On the other hand, the probe may be used in an unbiased fashion if ionic flame detection is not desired. Or, the biased and unbiased nature of the flameholder probe of the present invention may be a function of external events: the bias being cut in when the power level angle indicates the afterburner is to be lit and the bias being removed after the power level angle indicates afterburner chop and the signal on the line 62 indicates that the afterburner has been turned off, as is disclosed and claimed in the aforementioned Rosenbush et al application.

Thus, although the invention has been shown and described with respect to exemplary embodiments thereof, it should be understood by those skilled in the art that the foregoing and various other changes, omissions and additions may be made therein and thereto, without departing from the spirit and the scope of the invention.

I claim:

1. An ion/electrostatic probe for an afterburning gas turbine jet engine comprising a conductive flameholder totally electrically insulated from other engine parts and an electrical connection from said flameholder to a point external to the engine case.

2. An ion/electrostatic probe according to claim 1 wherein said flameholder is supported from the engine case by electrically conductive rods supported at said engine case by electrically insulated members.

3. An ion/electrostatic probe according to claim 1 wherein said flameholder is supported by non-electrically-conductive rods connected to the engine case of said engine.

* * * * *